Patented Jan. 10, 1939

2,143,642

UNITED STATES PATENT OFFICE 2,143,642

CANNED DRINK

Peter Bias, San Francisco, Calif.

No Drawing. Application June 20, 1938, Serial No. 214,840

6 Claims. (Cl. 99—155)

My invention relates to improvements in a canned drink, and it consists of the combinations, constructions, and arrangements hereinafter described and claimed, and in the steps hereinafter set forth. This case is a continuation-in-part of my application for a canned drink, Ser. No. 156,171, filed July 28, 1937.

Orange juice is a delightful and an invigorating drink, but it is difficult to preserve by canning. According to an article entitled "Possibilities and Limitations in Canning Orange Juice," appearing in Food Industries, volume 5, May 1933, pp. 172–173, M. A. Joslyn and C. L. Marsh, state that the problem of preserving orange juice in its natural state is yet to be completely solved. They further state that the stale taste in canned orange juice is caused by a chemical change.

Cold storage has been resorted to and a temperature of 32° F. has been maintained to cause the canned orange juice to retain its flavor and aroma during its distribution over a normal marketing period. As a further aid, the cans have been lined with "citrus enamel" in order to prevent the juice from acquiring a "tinny" taste.

Even where the orange juice is pasteurized at 165° F., it deteriorates in flavor in time, and if pasteurized at a higher temperature, it has a "cooked" taste.

The principal object of my invention is to add to the orange juice, apricot juice that will prevent the orange juice from becoming off-flavored even though canned for a long period of time. The added apricot juice gives a rich yellow color to the orange juice, causes it to retain its fresh fruit flavor indefinitely, and enhances the taste of the drink. The addition of apricot juice to orange juice in a manner hereinafter described, and the canning of the combined juices, will give the results just mentioned.

The combined canned juices will have the citrus tang of orange and the flavor of apricot. This blend is superior in flavor, tang, and fragrance, to either the straight orange or apricot juice. It is truly an exotic drink as well as a health drink.

In preparing the canned drink, whole apricots are thoroughly washed. It is possible to use the small sizes of fruit and thus materially save in the expense of canning. Grading of the fruit is not necessary. The fruit is preferably steamed until cooked through. This facilitates the pulping. Ordinarily, the heating of the fruit need not exceed five minutes.

The hot fruit is then run through screens of about one millimeter holes for puréeing. No hand pitting is needed and neither does the fruit have to be peeled. The particles of the puréed apricot fruit must not be too coarse, as the drink will then be too "grainy"; nor must it be too finely screened, for then it will be too "gluey" in consistency.

The apricot purée is sweetened with cane sugar in the proportion of 25 parts sugar to 75 parts purée by weight. The dietetic value of the apricot is greatly enhanced if a large proportion of the yellow pulp is included, because this pulp contains carotene, a pigment that is converted into vitamin A in the body. The sweetened purée is now made into a beverage by adding an equal amount of water, which in the present example is 100 parts.

To every 100 parts of this beverage, I add 200 parts of orange juice. The orange juice is preferably made from freshly picked, tree-ripened fruit at its optimum state of maturity. The cans are sterilized before being filled with the product, and are preferably exhausted for six minutes at 212° F. The juice is packed by five minutes exhaust at 150° F., and is given fifteen minutes pasteurization at 185° F. If larger than eight ounce cans are used, the cooking period may have to be extended. The cans are then allowed to cool and the product is ready for shipment.

The apricot juice prevents the orange juice from becoming off-flavor either at the time of canning or through long standing in the can. In a strict sense, the product may not be labeled "juice", since it is a diluted product and contains added sugar. It may be called beverage or be termed a nectar. The apricot juice has an attractive color, a pleasant aroma, and a fine flavor. Apricots are strongly basic in reaction on digestion; that is, they will leave an alkaline rather than an acid residue in the body and this will tend to counteract so-called "dietary acidosis."

Where the drink is to be sold at soda fountains, and the like, it is obvious that the 100 parts of water need not be added at the time the drink is canned. The concentrated drink can be canned and large cans shipped to the stores. When the can is opened at the store, the water may be added which will bring the drink to its proper consistentcy. In this way, transportation charges can be reduced and the cost of packaging the drink also reduced.

The formula for the drink may be varied according to taste, so long as a sufficient quantity of apricot juice is added to the orange juice to prevent the canned orange juice from becoming off-flavored. As little as 9.4% apricot juice has been added to a certain variety of good orange and this amount of apricot juice has prevented the orange juice from becoming off-flavored.

A number of chemical tests have been made on the juice by a firm of analytical-consulting-engineering chemists and they have proven that a coaction exists between the two ingredients making up the drink to the extent that the development of off-flavored orange juice is prevented during the canning process and subsequent thereto by combining apricot juice with the orange juice at the time of canning.

Orange juice contains orange oil and the off-flavor in orange juice is due to the development of products of decomposition in the orange oil. Ward B. Davis in the American Journal of Botany, 19, 101–5 (1932), has shown that all citrus fruit, except citron which comprises two varieties of lemons and one variety of sweet oranges, contains oil in the pulp cells. Curtis and Tompkins, Ltd., have found that orange juice contains a small quantity of oil from 0.05% to 0.10%. C. W. Eddy in the Journal of Industrial and Engineering Chemistry 28, 480–483 (1936), refers to a private communication from H. H. Mottern of the Department of Agriculture, Washington, D. C., who has noted under certain conditions that off-flavor of orange juice develops without appreciable loss of the reducing factor, i. e., without development of substances formed through the effect of oxygen on scorbutic acid or vitamin C. Off-flavors in orange oil has long been recognized and attention is drawn to U. S. Pharmacopoeia XI, which makes the following statement: "Oil of orange which has a terebinthinate odor must not be used or dispensed."

The following chemical experiments were made to determine what caused the orange juice to become off-flavor when not mixed with apricot juice and what chemical reaction took place to prevent the orange juice from becoming off-flavored when mixed with apricot juice. The off-flavor orange oil was checked by its reaction with an alcoholic solution of benzidine and found to give the characteristic color reaction for old oil. This color reaction is described by Adolfo Romeo, Riv. ital. essenze, profumi piante offic. 16, 113 (1934), in which he states that a fresh orange oil gives a yellow or green-yellow color and that an older oil gives an orange, orange-brown or orange-red reaction. The sample of the off-flavored oil checked, gave a deep orange color with a slight tint of red. A quantity of the oil was then added to fresh orange juice and the flavor produced was similar to the off-flavor developed in canned straight orange juice. The quantity of this off-flavored oil mounted to 0.10%. This clearly showed that the off orange oil caused the off-flavor in the orange juice.

A like-quantity of fresh orange oil was then added to the fresh orange juice with the result that the flavor of the fresh orange juice was not changed. A quantity of off-flavored orange juice was treated with a solvent to obtain the orange oil and then the solvent was evaporated from the oil without heat and in the absence of air. The resulting oil was diluted with fresh orange oil, then tested with benzidine and found to give the characteristic orange red color, showing clearly that the orange juice contained an off orange oil. As a final test, fresh orange juice was examined under the same conditions and the color produced by the benzidine reaction was green-yellow and characteristic of fresh orange oil.

The experiments clearly show that the combination of the canned fruit juices is not additive in character and the apricot juice prevents the orange juice from acquiring an off-flavored taste. Another experiment was tried to prove that the apricot juice does not merely mask the orange juice, but coacts with the orange juice to prevent the off-flavor. In this experiment between 25% and 50% of apricot juice was added to the off-flavored orange juice and there was still the off-flavor taste present. This clearly shows that apricot juice does not mask the off-flavor.

The art of canning apricot juice with orange juice to preserve the orange juice and prevent it from becoming off-flavored, is new. Orange crops and apricot crops vary in a marked degree from year to year. For example, in California, oranges mature ten out of every twelve months in the year and they are grown in different sections of the state under different soil conditions and with a variety of climatic changes. Every crop of oranges throughout the year may be as different from each other as Florida oranges are from California oranges. Thus it will be seen that the minimum content of apricot juice necessary to preserve orange juice, may not be the same with each crop and very likely will not be the same. In view of this, the minimum of 9.4% apricot juice used in preserving one of the cans of orange juice, cannot be considered the least possible apricot juice to carry out the intent of the invention, because there yet may be found a crop of good oranges and apricots that will permit the mixing of the two juices with even a less percentage of apricot juice being mixed to preserve the orange juice than that stated. The gist of applicant's invention is therefore the addition of a sufficient quantity of apricot juice to preserve the canned orange juice and prevent it from being off-flavored.

While I have shown only the preferred formula of my invention, it should be understood that various changes or modifications may be within the scope of the appended claims without departing from the spirit of the invention.

I claim:

1. The herein described process of making a canned drink which consists in cooking apricots, passing the apricots through a screen for forming a plup, adding 25 parts of sugar to every 75 parts of apricot pulp by weight, adding 100 parts of water to every 100 parts of the combined pulp and sugar, adding 200 parts of orange juice to every 100 parts of the combined apricot pulp, sugar, and water, sealing the drink in cans, and in cooking the cans and contents for about fifteen minutes at 185° F.

2. A canned concentrated drink comprising 37½ parts apricot pulp, and 200 parts orange juice.

3. A drink comprising orange juice, and an admixture of liquefied apricot pulp comprising substantially 33⅓% of the total volume of the drink to act as a preservative of the orange juice and prevent its developing an off-flavor.

4. A canned drink comprising 75 parts of apricot pulp by weight, 25 parts of sugar, 100 parts of water, and 400 parts of orange juice.

5. The herein described process consisting of preparing orange juice for canning and adding apricot juice to the orange juice in such amount as will act as a preservative against the development of an off-flavor.

6. A drink comprising an orange juice base, and an admixture of liquefied apricot pulp in such amount as will act as a preservative against the development of an off flavor, the ratio of the orange juice to the liquefied apricot pulp being alterable to accord with variations in the fruit characteristics.

PETER BIAS.